Oct. 16, 1956  E. M. ROTHERMEL ET AL  2,766,806
METHOD OF MAKING CORRUGATED FLEXIBLE CONDUITS
Filed Aug. 9, 1954  2 Sheets-Sheet 1

INVENTOR.
EDWARD M. ROTHERMEL
RUSSELL B. WADDELL, JR.

Oct. 16, 1956   E. M. ROTHERMEL ET AL   2,766,806
METHOD OF MAKING CORRUGATED FLEXIBLE CONDUITS
Filed Aug. 9, 1954   2 Sheets-Sheet 2

INVENTOR.
EDWARD M. ROTHERMEL
RUSSELL B. WADDELL, JR.

United States Patent Office 2,766,806
Patented Oct. 16, 1956

2,766,806

METHOD OF MAKING CORRUGATED FLEXIBLE CONDUITS

Edward M. Rothermel and Russell B. Waddell, Jr., Waynesville, N. C., assignors to The Dayton Rubber Company, a corporation of Ohio Application August 9, 1954, Serial No. 448,722

11 Claims. (Cl. 154—8)

The present invention relates to the manufacture of flexible, fluid impervious conduits and particularly to corrugated conduits which are reinforced against radial collapse and are commonly employed in connection with vacuum cleaner, automotive coolant systems, oxygen systems and the like.

In certain of the industrial and domestic arts, it has long been desirable to employ a flexible hose, the walls of which are impervious to the fluid being transmitted and are at the same time radially reinforced so that the opening through the conduit will not become restricted when the hose is severely bent or subjected to forces tending to cause its collapse. Such reinforcement has been provided by components of metal usually spring wire or steel, spirally wound to form a helix or coiled springlike member. It has been further almost universally desired that such hoses be of extremely light weight. The unfortunate result of this combination of desired properties has been that the necessity of using a reinforcing member has been opposed to the desirability of lightness and flexibility such that one of these desirable properties has normally been necessarily sacrificed.

In a copending application Serial No. 398,126, filed December 14, 1953, entitled Reinforced Flexible Conduits and Methods for Manufacturing Same, and of which the present application is a continuation-in-part, an improved hose or conduit having all of the above-mentioned desired properties has been disclosed. The disclosure of said copending application demonstrates the advantages of a hose construction embodying structural components of heat-softening materials such as the various well-known thermoplastic resins including polyvinyl chloride, polyvinyl alcohol, vinyl chloride-acetate, polyethylene; other heat softening resinous materials such as natural rubber and the various synthetic rubber-like compositions including the butadiene-styrene copolymers, polychloroprene, and others; and blends of these various materials. The present invention provides an improved method for manufacturing hose incorporating heat-softening materials such that certain difficulties previously encountered in the use of this type of material may be circumvented and certain additional advantages peculiar to the use of such substances may be attained.

For example, it has been found that when these heat-softening components are employed in the manufacture of a hose, together with certain metallic structures such as the metallic circumferential reinforcing wire above mentioned, the commonly employed exterior cording wire and the metallic mandrel upon which such hoses may be conveniently constructed, the heat which has been applied to the assembly in order to soften the heat-softening material, has been unevenly distributed insofar as the metallic components tend to dissipate the heat thereby causing those portions of the plastic material near the metallic components to remain cooler than the remainder of the hose. This uneven heat distribution has been particularly undesirable in those instances where substances having a critical softening point have been employed, in that the material surrounding the various above-mentioned metallic elements does not soften at the same time as does that material not in the immediate vicinity of these elements. Thus the corrugation of the hose to enhance its flexibility has resulted in imparting internal stresses to the body of the heat-softening material at the points of division between the softened and unsoftened portions thereof.

It has been discovered, however, that if the heat-softening material is first heated to its softening point before it is forced around and into contact with the metallic elements in the corrugating operation, the heat dissipating effect of these metal parts is rendered insignificant such that uneven heat distribution does not prevail and the previously mentioned internal stresses may be avoided. The present invention deals with the method for manufacturing conduits by means of which the heat-softening material may be heated prior to its being subjected to the corrugating forces and to contact with the metallic elements.

It is therefore an object of the present invention to provide an improved, flexible, fluid impervious, corrosion-resistant hose or conduit of light weight.

It is a further object of the present invention to provide such a hose, the flexibility of which is enhanced by the corrugation of at least the exterior surface of the same.

It is a further object of the present invention to provide such a hose construction employing a tubular body or cover member of a heat-softening material.

It is a further object of the present invention to provide such a hose employing heat-softening materials wherein the final hose will not be characterized by internal stresses therein.

To achieve these and other obvious objects and advantages of the present invention which may be apparent from a reading of the following disclosure, it is provided herein that the various hose components such as, for example, the circumferential reinforcing wire and the cover tube of heat-softening material be first assembled, and then subjected to conditions of heat, sufficient to raise the temperature of the heat-softening material to its softening point all before corrugating the tubular cover member. The present invention further provides a novel means of corrugating the hose by means of a pressure differential between the exterior and the interior of the same, such means being especially adapted to the construction and manufacture of flexible conduits of the type herein considered about a metallic mandrel. Whereas in the past, the tubular cover member has been pulled or otherwise forced down against a mandrel prior to its being heated to softening temperatures such that, during the heating, there has been considerable contact between the heat-softening material and the metallic mandrel, it is provided that the tubular cover member of heat-softening material will be brought to its softening temperature prior to being brought into direct contact with the mandrel.

Even where no mandrel or comparable metallic member is employed in the hose construction however, it has been found that a more satisfactory hose will result if, when heat-softening materials are employed, such materials are softened prior to being shaped in the corrugation process. Thus the method of this invention providing a means for softening such material prior to corrugation of the hose makes an additional contribution to the improved hose composed of heat-softening materials.

For a clearer understanding of the principles and features of the present invention and the advantages and improvements to be gained thereby, reference may be had to the following detailed description read in connection with the appended drawings.

Figure 1:
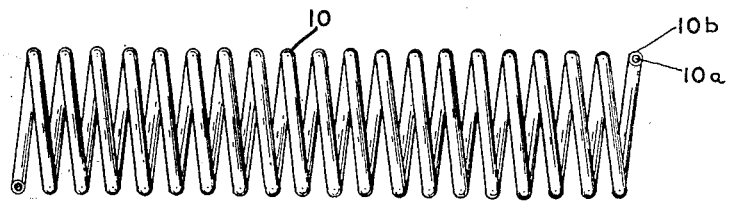
Figure 1 is an elevation of a wire reinforcement member suitable for use in the present invention.
Figure 2:
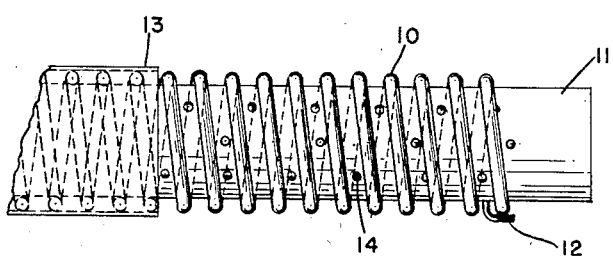
Figure 2 is a similar elevation of this circumferential reinforcing member as it is positioned on a mandrel and surrounded by a cover tube of heat-softening material.

Referring now to Figures 1 and 2, the circumferential reinforcing member employed in this preferred embodiment is in the form of a helix or coil spring 10 which, as previously stated, is usually and may conveniently be composed of spring steel or a similar metallic substance 10a which may be surrounded by a coating 10b.

The material employed in the wire helix may, in accordance with the disclosure of my previously mentioned copending application, consist of a coated wire element or be composed entirely of a non-metallic substance and particularly of a heat-softening material such as that employed in the cover tube. The wire helix employed as the reinforcing member may be pre-formed on a typical spring winding machine and the consecutive turns of the coils thus formed may be either contiguous or in spaced relationship. If, as in the case the coil shown in Figure 1, the respective turns are contiguous or nearly so, it is desirable, in order to obtain the desired pitch of convolutions in the final hose, to space these respective turns as, for example, about a mandrel 11. This spacing operation may be preformed by a simple lead screw arrangement which has a roller or guiding arm engaging the wire helix as the mandrel and coil thereon are rotated. Prior to this rotation it is, of course, necessary that the wire be anchored to the mandrel at one end, and this may be accomplished by means of winding the end of the coil with friction tape or the like, or by anchoring it upon a suitable hook or projecting finger 12.

Once the wire is thus spaced upon the mandrel, it is anchored at its opposite end, once again by tape windings or anchoring hooks similar to 12, so as to hold the spring in its spaced position.

The cover tube 13 is thereafter placed upon the mandrel and about the reinforcing member in the manner shown in Figure 2. The tube, as previously mentioned, is to be composed of a heat-softening material in accordance with the desirable properties which such imparts to flexible conduits of the type herein considered. These materials, as previously stated, may include thermoplastic substances; e. g., polyvinyl chloride, polyvinyl alcohol, the vinyl chloride-acetate resins, the vinyl-vinylidene chloride resins, and polyethylene. Rubber, or the various synthetic rubber compositions such as the butadiene-styrene copolymers, the butadiene-acrylic nitrile copolymers, the polychloroprenes, and the like, as well as blends of these materials with the above-mentioned thermoplastic substances, may be employed.

Reference to a heat-softening material must be understood to include all of the plastic substances which will soften upon being subjected to varying degrees of heat usually above room temperature. The term "plastic" as employed in this disclosure is taken to mean a material that contains as an essential ingredient an organic substance of large molecular weight, is solid in its finished state and, at some stage in its manufacture or in its processing into a finished article can be shaped by flow. The term "heat-softening" is to be distinguished from "thermoplastic" in that the former is broader and includes some of the thermosetting resins which, prior to their taking a set upon being heated, are also capable of plastic flow during which period they may be molded or otherwise shaped. Included among these non-thermoplastic but heat-softening materials are rubber and the various well-known synthetic rubber-like compositions mentioned above, as well as blends of these rubber-like materials with the previously mentioned thermoplastic substances.

One such heat-softening compound found suitable for the cover tube 13 of the present invention incorporates a blend of polyvinyl chloride, which is a thermoplastic substance, and a synthetic rubber-like composition; namely, a butadiene-acrylonitrile copolymer. This compound consists of the following parts by weight:

| | Parts by weight |
|---|---|
| Butadiene-acrylonitrile copolymer | 95 |
| Polyvinyl chloride | 55 |
| Tri-2-ethylhexyl phthalate | 15 |
| Filler (silica particles) | 20 |
| Filler (clay) | 5.0 |
| Accelerator (e. g., mercapto benzothiazole) | .5 |
| Sulfur | 3.0 |
| Antioxidant (e. g. di-heptyl diphenylamine) | 1.5 |
| Stabilizer (e. g., calcium stearate) | .7 |

In lieu of the tri-2-ethylhexyl phthalate other well-known plasticizers might be incorporated according to various processing factors and the like, well understood by the skilled artisan. Such plasticizers include tricresyl phosphate, dicapryl phthlate, tri-2-ethylhexyl phosphate, and others. The particular accelerator set forth above may also be replaced in situations understood by the mechanic. Possible replacements include benzothiazyl disulfide, certain of the dithiocarbamates, tetramethyl-thiuram disulfide and tetraethyl-thiuram disulfide. Similarly, one skilled in the art may replace the antioxidant and stabilizer combination given above with one or more of the following: calcium or cadmium soaps, calcium acetate, oxides of bismuth or barium, and organo-metallic compounds containing tin such as dibutyl tin laurate or dibutyl tin maleate.

The following properties attend the curing of the compound set forth for 15 minutes at a temperature of 340° F. and have been found particularly adaptable for use in a hose according to this invention:

| | |
|---|---|
| Ultimate tensile strength lbs. per sq. in | 2,900 |
| 300 modulus do | 1,000 |
| Graves tear resistance lbs. per in | 300 |
| Shore A durometer hardness | 52 |

In those instances where a mandrel such as 11 of Figure 2 is employed in the manufacture of the hose, it has been found desirable in connection with the teachings of this invention to employ as the mandrel a hollow steel tube the ends of which may be closed and the cylindrical wall of which is perforated to provide communication between the atmosphere within and that surrounding the same. These perforations 14 are preferably uniformly spaced throughout the mandrel and are of a very small diameter, say 1/32 in., such that, as the tube surrounding the mandrel becomes plastic, it will not flow through the holes. A suitable outside diameter for a mandrel to be employed in the manufacture of hose adapted for use in connection with vacuum cleaners is 1¼ in.

The wire coil reinforcing member 10 is, as explained above, first preferably formed into a helix or coil spring, the inside diameter of which is slightly larger than the outside diameter of the mandrel upon which it is to be placed. In the case of the 1¼ in. outside diameter mandrel employed in vacuum cleaner hoses, a preferred helix would have an inside diameter of 1⅜ in. when it is in the position of its preformed helix the respective turns of which are contiguous or nearly so. The gauge of the wire employed may vary depending upon certain considerations of desired strength, weight and flexibility; and a preferred diameter for vacuum hoses has been found to be from 0.045 in. to 0.090 in. The wire helix is stretched upon the mandrel 11 by first affixing one end of the coil to the anchoring hook 12 or similar anchoring means carried by the mandrel or applied thereto and then spacing the turns of the helix along the mandrel axially thereof by means of a spacer arm driven by a worm gear or other uniform drive such that these respective turns in the final assembly are spaced ¼ in. apart. The axial elongation attending this spacing of the respective turns of the helix results in a reduction of its inner diameter such that it is made to firmly embrace the outer surface of the mandrel. With the wire thus firmly engaging the outer periphery of the mandrel, the effective outside diameter of the wire-mandrel assembly in the case of the preferred example considered, would be 1¼ in. plus two times the diameter of the wire itself, say 0.180 in. or ³⁄₁₆ in., such that the effective outside diameter of the wire-mandrel assembly would be approximately 1⁷⁄₁₆ in. The inside diameter of the tube or cover such as 13 which is to be applied over this wire-mandrel assembly should be between the outside diameter of the mandrel by itself and the diameter of the wire-mandrel assembly as it is increased by the presence of the wire. In one preferred example, suitable for the dimensions previously considered, such as cover tube 13 might therefore have an inside diameter of 1¹⁵⁄₁₆ in. Diameters such as this enable the cover tube to firmly engage the wire as it is stretched upon the mandrel and at the same time to remain free from the mandrel surface between the turns of this wire.

Where the snug fitting cover tube such as 13 is to be applied over an assembly of a slightly larger diameter, it, of course, follows that there will be some difficulty in slipping the tube over the assembly. Various well-known means for overcoming the difficulty encountered in such an assembly, however, include expanding the tube by means of a vacuum forming tube or other well-known device prior to the insertion thereinto of the wire-mandrel assembly, or simply "blowing" the tube on the mandrel by applying air pressure to one end of the cover tube while sliding its opposite end upon the wire covered mandrel. This latter method is entirely satisfactory where an elastic tube is employed and is especially desirable in that no special equipment is involved.

Up to this point in the manufacture of the hose, the materials of the reinforcing member 10 and the cover tube 13 have been subjected to no basic change in configuration. From this point on, however, the cover tube 13 will be caused to assume its corrugated configuration in order that increased flexibility will be imparted to the final product. As is the standard practice in the hose manufacturing art, this corrugation will be provided by forcing or pulling down the cover tube along those points of the hose which are between the wire turns of the reinforcing member. If this corrugation is performed prior to the heating of the heat-softening materials, as has been the case in the past, not only will the finally applied heat be unevenly distributed, but the plasticity which accompanies the heating of the material will not be available to assist the formation of a stress-free corrugated tube.

The present invention, however, provides that, before any corrugating force is applied to the thermoplastic materials they be subjected to conditions of heat which will cause them to reach their softening point while the tube is in its supported position as shown in Figure 2; i. e., spaced from the mandrel by the reinforcing wire between tube and mandrel. This reversal of the previously employed sequence of heating and corrugating of the hose, in addition to being novel, involves certain other problems requiring novel solutions. Among these is the manner in which the corrugating force may be applied to the cover tube while the same is maintained at softening temperatures.

Figure 3:
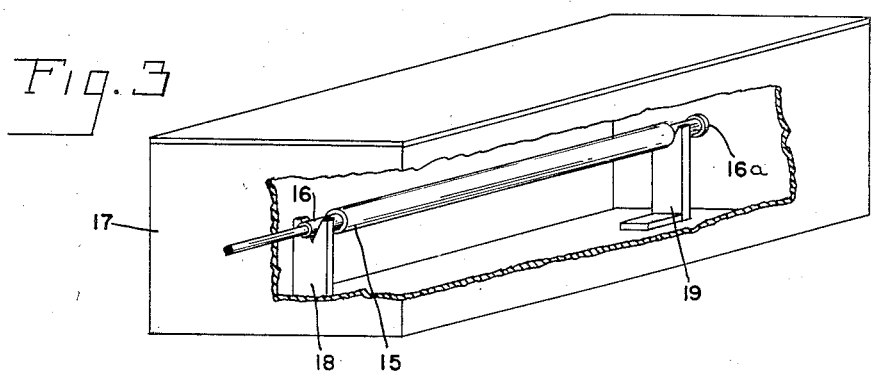
Figure 3 is a perspective partially broken away to show the positioning of a hose on a mandrel within a suitable heating chamber.
Figure 4:
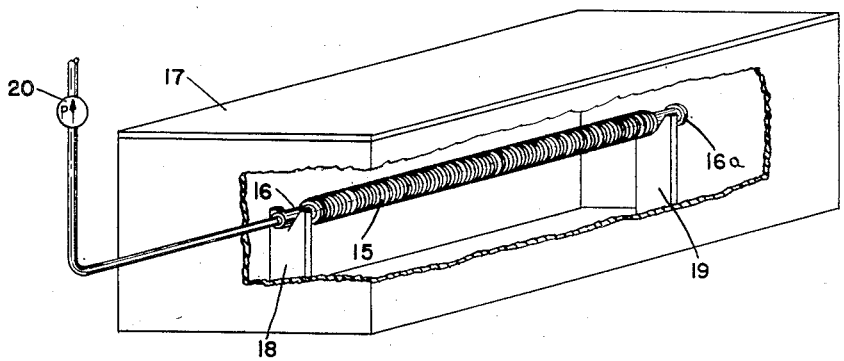
Figure 4 is a similar perspective, partially broken away, of a heating chamber containing the hose after it has been corrugated.

One preferred embodiment of the present invention designed to accommodate this problem is shown in Figures 3 and 4 wherein a cover tube 15 similar to 13 of Figure 2 is shown positioned about a mandrel 16 similar to 11 of Figure 2, the same being perforated at those points throughout its length underlying the cover tube 15. Between the tube and the mandrel is also a circumferential reinforcing member (not shown in Figure 3) similar to 10 of Figure 1, this reinforcing member serving to hold the tube 15 away from direct contact with the mandrel 16. The assembly is placed in a heated chamber such as a hot air curing oven 17 which is partially broken away to show the positioning of the hose and mandrel therewithin. The temperature to which the particular compound set forth above will have to be heated before becoming sufficiently soft to allow the corrugation desired in vacuum hoses is 300° F. plus or minus 10° F. Once this softening temperature has been reached and the material of the cover tube has reached a state at which it is capable of plastic flow, it is safe to undertake the corrugation of the same.

This corrugation may be most conveniently carried out, even while the hose is positioned on supports 18 and 19 in the heating oven by means of a method involving a pressure differential on opposite sides of the wall of the mandrel shown in Figures 3 and 4. As previously explained, the mandrel 16 is hollow and has a cylindrical wall characterized by perforations 22 connecting the interior thereof with the surrounding atmosphere. Upon the mandrel and covering the perforations are placed the wire and cover tube assembly, the cover tube being secured at its ends by tape windings or a suitable adhesive so as to effect a complete seal between the atmosphere surrounding the hose on the mandrel and that within the mandrel. The mandrel itself, of course, should be closed at one end by an end cap 16a or the like and connected to a vacuum pump 20 or other air evacuation means at its other end. As soon as the plastic material of the tube 15 has reached its state of flow, the pressure within the interior of the mandrel may be reduced, for example, by operation of the pump 20, with the result that the pressure of the atmosphere surrounding the mandrel will become relatively greater thereby forcing the tube inwardly against the mandrel at all points between the spaced turns of the circumferential wire reinforcing member. For the cover tube compounds and mandrel, wire and tube dimensions given above as desirable in the case of vacuum cleaner hoses, it has been found that a one inch of mercury vacuum is all that is necessary to provide the desired corrugating force.

Figure 5:
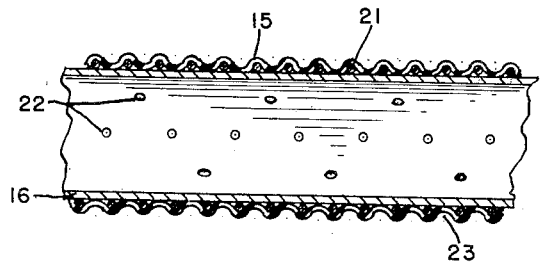
Figure 5 is a cross section through a portion of the hose and mandrel of Figure 4 taken on line 5—5 thereof.

The position of the cover tube 15 relative to the reinforcing member 21 and the mandrel 16 is best shown in Figure 5, wherein it is seen that those portions of the tube such as 23 which are between the respective turns of the wire are pulled down into contact with the mandrel. Where a completely thermoplastic substance is involved in the cover tube, it is necessary only that the vacuum or pressure differential be maintained upon the mandrel while allowing the assembly to cool until such time as the plastic material becomes cooled to a point below its softening point or state of plastic flow. The cooling is preferably accomplished by simply removing the mandrel and tube assembly from the oven while maintaining the vacuum in the interior of the mandrel to permit the corrugations to be formed. If desired, the same results may be accomplished by simply shutting off the supply of the heat to the oven 17 and allowing the mandrel to cool while maintaining the vacuum and subsequently removing the assembly. In either case, when the hose is properly formed the vacuum will be shut off and the hose removed from the mandrel. On the other hand, where a partially thermosetting resinous composition is employed in the cover tube, the specific compound set forth above being this latter type of composition, it is necessary that the pressure differential be maintained upon the mandrel until such time as the plastic composition becomes vulcanized or cured, thereby giving up its properties of plastic flow. In the case of the above-mentioned blend of polyvinyl chloride and butadiene-acrylonitrile copolymer for example, softening to a state of plastic flow takes place at approximately 300° F., while vulcanization or curing is effected at 340° F. Thus the corrugating forces are applied to the hose body when the 300° F. point is reached, but these forces must then be maintained until vulcanizing temperatures are reached and the vulcanization period has elapsed.

Where the diameter of the cover tube is such that the tube will snugly embrace the reinforcing coil, no force is necessary until the heat-softening material reaches the temperature at which it is capable of plastic flow. On the other hand, where there is apt to be lack of uniformity in the tube diameter, it has been found desirable to apply a nominal force to hold the tube in position upon the coil and to prevent sagging. In the case of the vacuum method illustrated, a ¼ in. of mercury vacuum drawn on the interior of the hollow perforated mandrel has been found satisfactory to hold the tube in position until its softening point is reached and the one inch of mercury vacuum is applied to provide the corrugations.

Several other expedients may be employed in the corrugation of the tubular body portion in lieu of the pressure differential method described above, however, it has been found that this particular method is especially adapted to the corrugation of the hose while it is positioned in a heater or curing oven and maintained in its state of plastic flow. Other means of achieving the desired pressure differential include the employment of a closed mandrel having a hollow interior and a reticulate wall upon which the tubular body portion 15 is placed at atmospheric pressure after which the mandrel, with the hose thereon, is heated and then subjected to elevated pressure such that the surrounding pressure will be greater than the atmospheric pressure sealed within the mandrel. A similar method for achieving such pressure differential comprises venting the interior of a perforated hollow mandrel to the atmosphere while the pressure within the heating oven or curing chamber is itself elevated to thereby become relatively greater than that within the hose-mandrel assembly.

Figure 6:
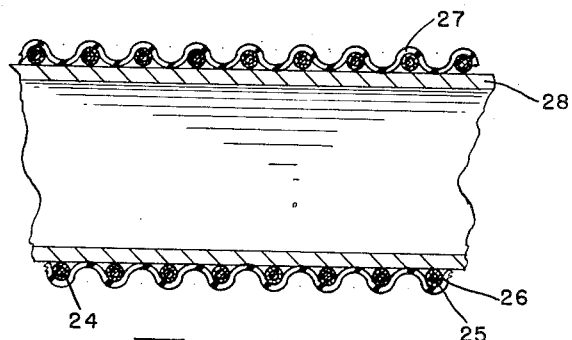
Figure 6 is a similar cross-sectional view of a hose according to this invention positioned upon a mandrel.

In Figure 6, there is shown a hose resulting from a modification of the teachings of the present invention, said modification involving the incorporation, as a circumferential reinforcing member, of a wire spring 24 wherein the wire core 25 of a spring steel or similar metallic substance similar to that previously described in connection with Figures 1, 2, 3, 4 and 5 is coated with a cover layer 26. This cover about the wire not only provides for a greater spacing of the cover tube 27 and the metallic mandrel 28 prior to the corrugation of the hose, but also assists in insulating this tube from the reinforcing wire core 25 and the mandrel 28 such that uneven heat distribution will not be encountered in bringing the plastic material up to its softening temperature. This cover or wire coating 26 also increases the effective diameter of the wire such that the depth of the corrugations in the final product will be greater to enhance the flexibility of the hose. The wire coating 26 may serve an additional function where it is of such a nature that it may be firmly adhered to the cover tube 27. Once the wire coating is so adhered, it will serve to securely hold the reinforcing wire in its proper position by virtue of the complete encirclement of the latter by the former. Applicant has found that, where the wire coating is composed of a fibrous material such as textile fabric, paper, asbestos, or fibers such as cotton or wool in a suitable binder such as rubber or similar elastomeric substance, the desired adhesion between wire coating and hose cover tube may be achieved, particularly where the cover tube is of a heat-softening plastic such that the fibers may be mechanically locked therein.

In one preferred hose, such as that described in my previously mentioned copending application, Serial No. 398,126, the coating upon this wire is of a plastic nature like that of the cover tube 27, such that, when the hose and wire assembled on the mandrel are subjected to elevated temperatures, the materials of the tube and the wire coating may fuse or coalesce to improve the integration of the wire and tube. This same softening involved in the fusion or coalescence of the two structural components will also result in a certain amount of flow of these materials which, when the same are in contact under pressure with a smooth cylindrical mandrel, will result in the interior surface of the hose becoming itself substantially smooth and cylindrical. Such a surface has been found particularly desirable in the case of vacuum cleaner hoses, insofar as this smooth surface does not present any obstructions to the continuous flow of air through the hose, and does not thereby interfere with its vacuum maintaining efficiency.

While the foregoing description has dealt with preferred embodiments of the method of the present invention involving the use of a building or forming mandrel, it is to be understood that this invention is not to be limited to the use of such mandrel, since the tube may be supported otherwise within the curing chamber, and a satisfactory product will result no matter how it was supported so long as, in accordance with the teachings of this invention, the plastic materials involved in the structural components are first raised to their softening temperature before the corrugation force is applied.

It is further conceivable that compositions having a softening temperature at or near room temperature may be employed in the present invention, particularly where such compositions are of the thermosetting variety in that the same will, after a time, become vulcanized or cured and will lose their properties of plastic flow. The teachings of the present invention will, of course, nonetheless apply to such materials in that the same desired results will be achieved if care is taken that these materials also are in their state of plastic flow at the time the corrugating force is applied to the tube.

While the present invention has been described in considerable detail in connection with certain preferred embodiments specifically set forth, it is to be understood that these specific embodiments have been referred to for purposes of description only and in no way represent limitations on the scope of the present invention as it is particularly defined in the following claims.

We claim:

1. A method for the manufacture of corrugated flexible conduits comprising forming a circumferential reinforcing member, placing this member within a sheath of plastic material, causing said material to achieve a state of plastic flow, thereafter forcing the sheath while in such state radially inwardly between the respective helices of the reinforcing member and allowing the sheath to become fixed in the position to which it has been so forced.

2. A method for the manufacture of corrugated flexible conduits comprising preforming a helical reinforcing member, placing said member within a sheath of heat-softening plastic material, heating said material to cause it to achieve a state of plastic flow, thereafter forcing the sheath while in such state radially inwardly between the respective helices of the reinforcing member and allowing the sheath to become fixed in the position to which it has been so forced.

3. A method for the manufacture of flexible conduits comprising preforming a helical reinforcing member, surrounding said member within a sheath of thermoplastic material, heating said material to a point at which it is capable of plastic flow, thereafter forcing the sheath radially inwardly between the successive helices of the reinforcing member while said sheath is maintained at that temperature at which it is capable of plastic flow and then allowing said sheath to cool to a temperature below its softening point while maintaining said radially inward force thereon.

4. A method for the manufacture of corrugated flexible conduits comprising preforming a helical reinforcing member, placing this member within a sheath of heat-softening thermosetting plastic material, heating said material until it reaches the state at which it is capable of plastic flow, forcing this material while it is in such state radially inwardly between the respective helices of the reinforcing member and maintaining the elevated temperatures and radially inward forces to which the material has been subjected until such material becomes set in the position to which it has been forced.

5. A method for the manufacture of corrugated flexible conduits comprising positioning a helical wire reinforcing member within a tubular sheath of plastic material, bringing said material to a state of plastic flow, thereafter and while such material is in said state reducing the pressure within said sheath relative to that exteriorly thereof until the sheath is forced radially inwardly and firmly embraces said helical member and causing the plastic material to return to its solid state while held at its forced position.

6. A method for the manufacture of corrugated hose comprising spacing the respective turns of a circumferential reinforcing member along a perforated cylindrical mandrel, placing a sheath of heat-softening plastic material about said mandrel and reinforcing member, heating said sheath until the material thereof reaches a state of plastic flow, thereafter and while the sheath is so heated reducing the pressure within said mandrel relative to the atmospheric pressure surrounding the exterior thereof whereby the sheath is drawn between the respective turns of the reinforcing member, and maintaining said reduced pressure while causing the sheath to become solidified.

7. A method according to claim 6 wherein said relative reduction in pressure is achieved by creating a partial vacuum within the hollow interior of said mandrel.

8. A method according to claim 6 wherein said relative reduction in pressure is achieved by placing the mandrel with tubular sheath thereon in a pressurized chamber while venting the interior of the mandrel to normal atmospheric pressure.

9. A method for the manufacture of corrugated hose comprising spacing the successive turns of a circumferential reinforcing member around a perforated cylindrical mandrel, placing a sheath of heat-softening plastic material around said mandrel and reinforcing member, slightly reducing the pressure within said mandrel so as to hold said sheath against the outer periphery of said reinforcing member but away from substantial contact with the mandrel, heating said sheath until it reaches a state of plastic flow, thereafter and while the sheath is in such state increasing the pressure differential between the interior and exterior of the sheath to force the same radially inwardly to contact the mandrel between the successive turns of said reinforcing member, and maintaining said increased pressure differential until the material of said sheath becomes permanently set.

10. A method for the manufacture of flexible conduits comprising coating a wire strand, forming the coated strand into a cylindrical element, positioning this cylindrical element within a sheath of plastic material, bringing said plastic material to a a state of plastic flow, thereafter and while said material is in such state forcing the sheath radially inwardly to firmly embrace said cylindrical element and allowing the sheath to become fixed in the position to which it has been so forced.

11. A method according to claim 10 wherein the wire strand is coated with a layer of thermoplastic material and wherein the tubular sheath is formed of thermoplastic material which becomes bonded to the plastic coating on the wire.

References Cited in the file of this patent

UNITED STATES PATENTS

| 1,599,905 | Loughead | Sept. 14, 1926 |
| 2,171,764 | Ramsdell | Sept. 5, 1939 |
| 2,641,302 | Martin et al. | June 9, 1953 |

FOREIGN PATENTS

| 651,097 | Great Britain | Mar. 14, 1951 |
| 652,810 | Great Britain | May 2, 1951 |